United States Patent [19]

Feldhues et al.

[11] Patent Number: 5,066,731
[45] Date of Patent: Nov. 19, 1991

[54] PROCESS FOR MODIFYING ELECTROCONDUCTIVE POLYMERS USING ION EXCHANGE

[75] Inventors: Michael Feldhues, Bad Soden am Taunus; Günther Kämpf, Oestrich-Winkel; Thomas Mecklenburg, Butzbach, all of Fed. Rep. of Germany

[73] Assignee: Hoechst Aktiengesellschaft, Frankfurt am Main, Fed. Rep. of Germany

[21] Appl. No.: 517,924

[22] Filed: May 2, 1990

Related U.S. Application Data

[62] Division of Ser. No. 261,359, Oct. 24, 1988, abandoned.

[51] Int. Cl.$^5$ ............................................. C08G 85/00
[52] U.S. Cl. .................................. 525/417; 204/59 R; 252/500; 525/210; 525/221; 525/291; 525/301; 528/380
[58] Field of Search ............... 525/417, 210, 221, 291, 525/301

[56] References Cited

U.S. PATENT DOCUMENTS

| | | | |
|---|---|---|---|
| 4,521,589 | 6/1985 | Yamamoto | 528/380 |
| 4,578,433 | 3/1986 | Muenstedt | 525/417 |
| 4,691,005 | 9/1987 | Sato | 525/380 |
| 4,737,557 | 4/1988 | Sato | 525/380 |

OTHER PUBLICATIONS

Eisenbaumer, R. L. et al., Synthetic Metals, 18, (1987), 277–282.
Tourillon, G. et al., J. Polym. Sci., 22, 33–39 (1984).

*Primary Examiner*—Christopher Henderson

[57] ABSTRACT

In electrically conducting polymers in their oxidized (doped) form, which are known per se, the anions can be exchanged in any desired manner, if the polymer in solution is brought into contact with a salt containing the anion to be exchanged and the solution equilibrium is established, taking account of the solubility product of the salts present. In this manner, the properties of the electrically conducting polymers can be adapted to different purposes.

5 Claims, No Drawings

PROCESS FOR MODIFYING ELECTROCONDUCTIVE POLYMERS USING ION EXCHANGE

This application is a division of our copending application Ser. No. 07/261,359, filed Oct. 24, 1988 now abandoned.

It is known to polymerize heteroaromatics oxidatively, for example by anodic oxidation, and thus form electrically conducting polymers which are of interest for electrical engineering, in semi-conductor components, switches, screening materials, solar cells and as electrode materials in electrochemical syntheses and in reversible charge stores. In particular soluble, electrically conducting polymers open up new fields of application to their processability, such as, for example, antistatic finishing of films and fibers. However, the conducting polymers, which are soluble in their doped form, need improving with respect to long-term stability of the electrical conductivity, thermal stability, film-forming properties and adhesive properties on certain base materials (cf. synthetic metals 15, 169 (1986).

The reason is that the ions present in the positively doped conducting polymers determine to a large extent the physical properties of these compounds, in particular the magnitude and long-term stability of the electrical conductivity, thermostability and the film-forming properties (cf. J. Polymer Sci., Pol. Phys. Ed. Vol. 22, 33 (1984). Thus, for example, especially the perchlorate anion, which is often used in the electrochemical preparation of conducting polymers on account of its resistance to oxidation and the ready availability of salts soluble in organic solvents, is labile in the presence of organic compounds in the case of thermal and mechanical stress and is therefore unsuitable for most applications. Conducting polymers having poisonous, reactive and moisture-sensitive anions such as, for example, hexafluoroarsenate, hexafluoroantimonate, hexachloroantimonate or tetrachloroferrate are also frequently synthesized. These polymers are in this form also unsuitable for most applications. In the case of the known conducting polymers it has been impossible so far to incorporate during polymerization any desired anions selectively in the polymers or oligomers, neither by chemical nor by electrochemical doping, without effecting the course of the polymerization and thus, for example, the degree of polymerization. If the anions are exchanged for others afterwards by means of the known reaction sequence (reduction to the undoped form, followed by oxidation in the presence of a new anion), furthermore a "memory-effect" of the three-dimensional structure of the polymer was observed. Polymers having modified properties, for example with respect to electrical conductivity, long-term stability of the conductivity, thermal stability, solubility, film-forming properties and adhesive properties on different base materials, could not be obtained in a satisfactory manner by this method.

Therefore, the object was to find a process by which the anions can be exchanged in the positively doped form of the conducting polymers for any desired anions in a simple manner.

It has been found that the anion exchange can be achieved in solution by establishing the solution equilibrium, taking into account the solubility product of the salts present.

Accordingly, the invention relates to an intrinsically electrically conducting polymer in the oxidized (doped) form consisting of at least one polymer radical cation and the equivalent amount of at least one anion, wherein the polymer radical cation on the average consists of 20 to 100% of structural units which through linkage via the 2-position and/or 5-position are derived from at least one monomer of the formula (I)

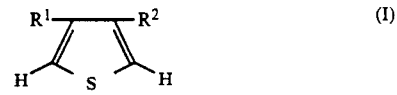

in which $R^1$ represents a $C_2$-$C_{22}$-alkyl group, —CH$_2$O(CH$_2$CH$_2$O)$_n$—CH$_3$ where n is 1 to 4, a $C_1$-$C_{12}$-alkoxy group or —O(CH$_2$CH$_2$O)$_n$CH$_3$ where n is 1 to 4 and $R^2$ represents a hydrogen atom, a $C_1$-$C_{12}$-alkyl group or a $C_1$-$C_{12}$-alkoxy group, 0 to 80% of structural units which are derived from at least one electron-rich heteroaromatic compound which can form electrically conducting polymers and is copolymerizable with the monomers (I), and the anion on the average consists of 0 to 100% of at least one inorganic anion from the group consisting of halides, pseudohalides, halo complex anions of an element from groups 3a, 4a and 5a of the periodic table of the elements, oxo complex anions of an element from groups 3a, 4a, 5a, 6a and 7a and anionic complexes of the transition metals, 100 to 0% of at least one monomer or polymer organic anion having at least one atom or at least one functional group which can carry at least one negative charge and represents the conjugate base of a Brönsted acid, in which the chemical structure and the degree of polymerization of the polymer radical cation is independent from the particular anion incorporated.

Furthermore, the invention relates to a modified, intrinsically electrically conducting polymer as claimed in claim 1 wherein 10 to 100% by weight of the anion consist of a phenolate, carboxylate, phosphonate and/or sulfonate anion.

The polymers according to the invention contain in the radical cation the same structural units as the soluble conducting polymers from which they have been prepared. These are derived through linking via the 2-position and/or 5-position from at least one monomer of the general formula (I)

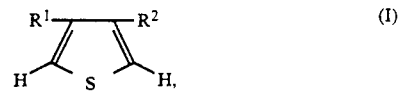

in which $R^1$ denotes a $C_2$-$C_{22}$-alkyl, preferably $C_2$-$C_{12}$-alkyl, in particular $C_2$-$C_4$-alkyl group, CH$_2$O(CH$_2$CH$_2$O)$_n$CH$_3$ where n is 1 to 4, preferably 1 or 2, and a $C_1$-$C_{12}$-alkoxy, preferably $C_1$-$C_4$-alkoxy, in particular $C_1$-$C_2$-alkoxy group or —O(CH$_2$CH$_2$O)$_n$CH$_3$ where n is 1 to 4, preferably 1 or 2, and $R^2$ represents a hydrogen atom, a $C_1$-$C_{12}$-alkyl, preferably $C_1$-$C_4$-alkyl group, in particular a methyl group or a $C_1$-$C_{12}$-alkoxy, preferably $C_1$-$C_4$-alkoxy group, in particular a methoxy group.

Examples of representatives of the formula (I) are 3-butylthiophene, 3-pentylthiophene, 3-hexylthiophene, 3-octylthiophene, 3-dodecylthiophene, 3-(methoxyethoxyethoxymethyl)thiophene, 3,4-diethylthiophene, 3-butyl-4-methylthiophene, 3-methoxythiophene, 3- ethoxythiophene, 3-propoxythiophene, 3-(methoxyethoxy)thiophene, 3-methoxy-4-methylthiophene, 3-ethyl-4-methoxythiophene, 3-butyl-4-ethoxythiophene, 3-ethoxy-4-methylthiophene, 3-ethoxy-4-ethylthiophene, 3-butoxy-4-methylthiophene, 3,4-dimethoxythiophene, 3-ethoxy-4-methoxythiDphene, 3-butoxy-4-methoxythiophene. structural units which are derived from mixtures of the monomers (I) can also be present in the radical cation.

The polymers according to the invention can also contain in the radical cation structural units which are derived through linkage via the 2-position and/or 5-position from at least one of the known electron-rich heteroaromatics, preferably from pyrrole which is unsubstituted or substituted in the 3-position or 3- and 4-position, furan or thiophene which can form electrically conducting polymers and are copolymerizable with the monomers (I).

Examples of suitable comonomers are pyrrole, 3-methylpyrrole, 3-chloropyrrole, 3-acetylpyrrole, 3,4-dimethylpyrrole, N-methylpyrrole, thieno[3,2-b]pyrrole, carbazole, thiophene, 3-methylthiophene, 3,4-dimethylthiophene, isothianaphthene, thieno[2,3-b]thiophene, dithieno[3,2-b; 2',3'-d]thiophene, dibenzothiophene, 1,2-di-(2-thienyl) -ethene, 1,2-di(3-methylthien-2-yl)-ethene, 1,2-di-(2-furanyl)ethene, 1-(2-furanyl)-2-(2-thienyl)ethene, 1-(2-pyrrolyl)-2-(2-thienyl)ethene, 1,4-di-(2-thienyl) buta-1,3-diene, 1,4-di-(2-furanyl)-buta-1,3-diene, 1,4-di-(2-thienyl)-benzene, terthienyl (2,5-di-(2-thienyl)thiophene), 2,5-di-(2-thienyl)-pyrrole, 2,2'-bithiophene, 3,3'-dimethyl-2,2'-bithiophene, 3,3'-dimethoxy-2,2'-bithiophene, 3,4'-dimethoxy-2,2'-bithiophene, 4,4'-dimethoxy -2,2'-bithiophene, preferably 3-methylthiophene.

The polymers according to the invention contain in the radical cation 3 to 100 structural units, preferably 5 to 50 structural units. The amount of the structural units, which are derived from at least one monomer of the formula (I), is on the average 20 to 100% by weight, preferably 50 to 100% by weight, and in particular 90 to 100% by weight, relative to the structural units present in the undoped polymer. The amount of structural units which are derived from comonomers is on the average 0 to 80, preferably 0 to 50% by weight.

The electrically conducting polymers according to the invention are present in oxidized (doped) form, in which the number of positive charges corresponds to the number of soluble conducting polymers used from which they have been prepared, and are in most cases 10 to 30%, preferably 15 to 25%, relative to the number of the monomer units.

The polymers according to the invention contain an equivalent amount with respect to the amount of the radical cation of at least one anion, 10 to 100%, preferably 50 to 100%, in particular 80 to 100%, of the anions being different from those present in the soluble conducting polymer used. These anions can be, in addition to the anions originating in the preparation or doping process for the polymer used, all inorganic and organic anions which together with an inorganic or organic cation form a salt which is soluble in a solvent in which the conducting polymer used is also soluble. The chemical structure and the degree of polymerization of the polymer radical cation is thus independent of the particular anion incorporated.

Suitable inorganic anions are present in the group consisting of halides, pseudohalides, halo complex anions, preferably fluoro and chloro complex anions of an element of groups 3a, 4a and 5a of the periodic table of the elements, preferably of boron, silicon, phosphorus, arsenic, antimony, oxo complex anions of an element of groups 3a, 4a, 5a, 6a and 7a, preferably of boron, carbon, silicon, nitrogen, phosphorus, arsenic, antimony, sulfur, chlorine, bromine, iodine, anionic complexes, preferably fluoro, chloro, oxo, cyano, phosphine, carbonyl, cyclopentadienyl complexes of the transition metals, preferably of copper, silver, gold, titanium, vanadium, chromium, molybdenum, tungsten, manganese, iron, cobalt, rhodium, nickel, palladium, platinum. The tetrafluoroborate anion and the hexafluorophosphate anion are particularly preferred.

Examples of suitable inorganic anions are: $F^-$, $Cl^-$, $Br^-$, $I^-$, $CN^-$, $OCN^-$, $SCN^-$, $N_3^-$, $BF_4^-$, $PF_6^-$, $AsF_6^-$ $SbF_6^-$, $BO_3^-$, $NO_3^-$, $PO_4$, $H_2PO_4^-$, $SO_4$, $HSO_4^-$, $ClO_4^-$, $IO_4^-$, $Cu[(CN)_4]^{3-}$, $Au[(CN)_2]^-$, $CrO_4^{2-}$, $MnO_4^-$, $FeCl_4^-$, $Fe[(CN)_6]^{3-}$, $Co[(CN)_6]^{3-}$ $NiCl_4^{2-}$, $RhCl_6^{3-}$, $PtCl_6^{2-}$.

Suitable anions are all monomer or polymer organic anions carrying at least one atom or at least one functional group which can at least carry one negative charge and represents the conjugate base of a Brönsted acid, for example phenolates, preferably phenolates substituted by electron acceptors, carboxylates, preferably alkyl carboxylates, perfluoroalkyl carboxylates, alkenyl carboxylates, aryl carboxylates, phosphonates and phosphinates, preferably alkyl phosphonates and alkyl phosphinates, perfluoroalkyl phosphonates and perfluoroalkyl phosphinates, alkenyl phosphonates and alkenyl phosphinates, aryl phosphonates and aryl phosphinates, sulfonates, preferably alkyl sulfonates, perfluoroalkyl sulfonates, alkenyl sulfonates, aryl sulfonates.

Examples of conjugate Brönsted acids of suitable organic anions are: 2,4-dinitrophenol, picric acid (2,4,6-trinitrophenol), poly(methylenecresol) (Alnovol), acetic acid, octanoic acid, perfluorooctanoic acid, acrylic acid, polyacrylic acid, polyethylacrylate/polyacrylic acid copolymer, methacrylic acid, polymethacrylic acid, polymethyl methacrylate/polymethacrylic acid copolymer, poly -(2-acrylamino-2-methyl-1-propanesulfonic acid), benzoic acid, methanephosphonic acid, methanesulfonic acid, octanesulfonic acid, trifluoromethanesulfonic acid, perfluoroethanesulfonic acid, perfluoroctanesulfonic acid, vinylsulfonic acid, polyvinylsulfonic acid, benzenesulfonic acid, toluenesulfonic acid, styrenesulfonic acid, polystyrenesulfonic acid, polystyrene/polystyrenesulfonic acid copolymer, camphor-3-sulfonic acid.

The preparation of the modified electrically conducting polymers according to the invention is carried out by exchange of anions in a known soluble, electrically conducting polymer for inorganic anions and/or monomer or polymer organic anions. The reaction takes place in a solvent suitable for the known conducting polymer used in the presence of a salt containing the new anion, which is soluble in this solvent. The anion exchange takes place by establishing the solution equilibrium, taking account of the solubility product of the salts present.

The composition at equilibrium is fixed, if necessary, by evaporation of the solvent or subsequent precipitation of the modified conducting polymer.

The solubility of the conducting polymer used for the anion exchange in the oxidized (doped) form is an essential condition for the process according to the invention. Examples of suitable soluble, electrically conducting polymers are poly(3-methoxythiophene) tetrafluoroborate, poly(3-methoxythiophene) perchlorate, poly(3-methoxythiophene) tetrachloroferrate, poly(3-ethoxythiophene) tetrafluoroborate, poly(3-(methoxyethoxyethoxy)thiophene) hexafluorophosphate, poly(3,4-dimethoxythiophene) tetrafluoroborate, poly(3-butylthiophene) hexafluoroantimonate, poly(3-dodecylthiophene) hexafluorophosphate, poly(3-methylthiophene-co-3'-n-butylthiophene, 50:50) hexafluoroantimonate, poly(3-methylthiophene-co -3'-n-butylthiophene, 75:25) hexafluorophosphate, poly(3-(methoxyethoxyethoxymethyl)thiophene) hexafluorophosphate.

The concentration of the polymer used is 1 to 100 g, preferably 5 to 50 g, of conducting polymer per $dm^3$ of solvent.

The anion exchange requires salts which contain the new anion to be incorporated in the conducting polymer and are soluble in a solvent in which the conducting polymer salt is also soluble. Suitable cations which confer the required solubility on these salts are, in addition to alkakine earth metal cations and $H^+$ in particular the alkali metal cations. Cations of the $R_4N^+$ and $R_4P^+$ type are particularly favorable, in which the substituents R each denote, independently of one another, a hydrogen atom, a $C_1$-$C_{12}$-alkyl group, preferably a $C_1$-$C_4$-alkyl group, a cycloalkyl group, an aryl group or an arylalkyl group, preferably a benzyl group.

In general, the salt concentration is in the range from 0.01 to 10 mol, preferably from 0.1 to 1 mol, of salt per $dm^3$ of solvent. The ratio of the equivalents of anions added by means of the salt to the equivalents of anions present in the conducting polymer is 0.1 to 100, preferably 0.5 to 20. To obtain complete exchange of the anions present in the conducting polymer used by the new anions added by means of the salt, it is advantageous to repeat the anion exchange, if necessary, even several times, by using the conducting polymer again after isolation from the reaction mixture of the previous exchange reaction.

Solvents which are suitable for the anion exchange according to the invention are all those solvents which are capable of dissolving the conducting polymer used in its oxidized (doped) form and also the salt containing the new anion. The resulting modified conducting polymer may, but does not have to, be soluble in this solvent. Examples of suitable solvents are: acetone, acetonitrile, benzonitrile, γ-butyrolactone, methyl cyanoacetate, dichloromethane, diethyl ether, dimethoxyethane, dimethyl carbonate, N,N-dimethylformamide, dimethyl sulfoxide, dioxane, ethyl acetate, 3-methoxypropionitrile, N-methylpyrrolidone, nitrobenzene, nitromethane, nitropropane, propionitrile, propylene carbonate, sulfur dioxide, sulfolane, tetrahydrofuran, tetrahydronaphthalene, trichloroethene, triethyl phosphate. Mixtures of more than one solvent can also be used.

The solution of the conducting polymer used and the salt required for the anion exchange can be produced not only by simultaneous addition of a common solvent to both components but also by dissolving one component and then adding the second component. Furthermore, it is possible to dissolve both components separately in the same or in different solvents which are, however, immiscible in one another and to combine them only afterwards.

Preference should be given to this alternative, if the modified conducting polymer is sparingly soluble or insoluble in the reaction solution.

The anion exchange is preferably carried out at room temperature. However, it is also possible to vary the temperature in a wide range whose lower limit is determined by the solidification temperature and whose upper limit is determined by the boiling temperature of the solvent system and which in most cases is the range from −60 to 80° C. In the case of solvents boiling below or slightly above room temperature, it is advantageous to use elevated pressure.

The length of the anion exchange depends on the rate at which the equilibrium is established in the polymer/salt/solvent system used and is usually less than one hour. However, in the case of sparingly soluble or slightly dissociated polymers or salts, the anion exchange can take up to 24 hours.

To isolate the modified electrically conducting polymers after the anion exchange, the solution is evaporated to dryness by evaporation of the solvent. If the modified conducting polymer has already precipitated during the anion exchange because the solubility product had been exceeded, it can be isolated, for example by filtration. A variation which is also suitable consists in precipitating the modified polymer by mixing the solution with a further solvent which is immiscible with the solvent used for the anion exchange and does not dissolve the modified polymer and separating it off, for example by filtration. The solid crude product is washed with a solvent which does not dissolve the modified conducting polymer but dissolves the salt used. The process according to the invention generally produces the modified conducting polymer in yields of 80 to 100%.

The invention is illustrated in more detail by the examples which follow. The parts and percent listed in the examples are by weight, unless stated otherwise. The specific conductivity was determined by means of four-point measurements on pellets. The decomposition behavior was determined by thermal gravimetry (TG) and differential scanning calorimetry (DSC). The UV-/VIS/NIR spectra were recorded using solutions in acetonitrile. The individual molecular weights and the molecular weight distribution were determined by mass spectroscopy (MS) and gel permeation chromatography (GPC), using the neutral (undoped) form of the conducting polymers, which had been obtained, for example, by electrochemical reduction.

EXAMPLE 1

The poly(3-methoxythiophene) tatrafluoroborate used for this example was prepared as follows: 4.34 parts of tetraethylammonium tetrafluoroborate, 4.56 parts of 3-methoxythiophene and 250 parts of acetonitrile were placed in an undivided electrolytic cell equipped with a cooling jacket. The cathode consisted of V2A steel sheets, 80 mm long, 55 mm wide. A carbon felt (base weight about 0.3 kg/$m^2$, specific surface area (BET) about 1.5 $m^2$/g), 80 mm long, 6 mm wide and 3 mm thick, was used as the anode (geometric area of both sides about 90 $cm^2$). The anode was attached at a distance of 2 cm parallel to the cathode, separated by a polypropylene network spacer. At an electrolysis temperature of 20° C. and an anode current of 400 mA, a cell voltage of 5 to 11 volts was obtained. After half of the amount of current required by theory, the anode covered with oligomers was exchanged for a new one, and the electrolysis was terminated after the theoretical amount of current had been consumed. The anodes covered with the crude product were each dried immediately after the exchange and placed in a bath containing methylene chloride and continuously digested in this bath for an extended period of time. After they had been dried again, the carbon felts covered with the oligomers were digested in a bath containing acetonitrile until the oligomers had virtually completely gone into solution. The deep dark blue solution was evaporated to dryness in a rotary evaporator. The crude product was comminuted by mechanical means, washed with water, dried, digested with methylene chloride for 12 hours, then filtered off and dried. To purify it further, the material obtained was again dissolved in acetonitrile and centrifuged at 10,000 r.p.m. for 0.5 hour, and the centrifugate was evaporated to dryness in a rotary evaporator. This gave 1.92 parts of a solid having a bronze metal shine. Elemental analysis gave the following values: 44.5% of C, 3.2% of H, 22.1% of S, 9.4% of F. A pellet of the ground product had a specific conductivity of $1.8 \times 10^{-3}$ S/cm. DTG at 245° C. showed a weight loss of less than 10%. DSC showed a maximum at 325° C. In the mass spectrum of the undoped form, the molecular ions of the pentamers (m/e=562) and hexamers (m/e=674) were detected. GPC of the undoped form showed that more than 80% of the product consisted of pentamers and hexamers. In the UC/VIS/NIR spectrum in tetrahydrofuran, the undoped pentamer showed a maximum at $\lambda=460$ nm and the undoped hexamer a maximum at $\lambda=486$ nm. 14.0 g of is poly(3-methoxythiophene) tetrafluoroborate were dissolved in 2 dm³ of acetonitrile. 56 g of tetraethylammonium trifluoromethanesulfonate were added with stirring. The solution was stirred for about 1 hour and then evaporated to dryness in a rotary evaporator. The residue was digested twice with 500 cm³ each of dichloromethane, filtered through a glass-sinterd crucible of pore size G3 and dried. The crude product (13.4 g) was dissolved in 1 dm³ of acetonitrile and again subjected to the procedure described above. This gave 12.5 g of a solid having a bronze metal shine. Elemental analysis gave the following values: 43.3% of C, 3.2% of H, 25.3% of S, 6.6% of F. A pellet of the ground product had a specific conductivity of $1.3 \times 10^{-3}$ S/cm. TG up to 220° C. showed a weight loss of less than 10%. DSC showed an exothermic maximum at 340° C. The product was more soluble in various organic solvents, for example in acetonitrile, than the starting material. The UV/VIS/NIR spectrum, the mass spectrum and also GPC of the undoped form gave data which were identical to those measured using the starting material.

EXAMPLE 2

First, a poly(3-methoxythiophene) tetrafluoroborate was prepared: 56.5 parts of 3-methoxythiophene, 54.3 parts of tetraethylammonium tetrafluoroborate and 1,500 parts of acetonitrile were placed in a trough-like undivided electrolytic cell. In the middle of the cell, a water-cooled hollow cathode made of V2A steel, 170 mm long and 170 mm wide, was arranged. On both sides, at a distance of 2 cm parallel to the cathode, an anode made of carbon felt (basis weight 0.4 kg/m², specific surface area (BET) about 1.5 m²/g), 170 mm long, 170 mm wide and 4 mm thick, was attached on each of these sides. Between the cathode and both of the anodes a polypropylene network spacer was present. At an electrolysis temperature of 25° C. and an anode current of 4 A, a cell voltage of 5 to 11 volts was obtained. The electrolysis was terminated after the amount of current necessary by theory had been consumed. The anodes covered with the crude product were each dried immediately after the exchange and placed in a bath containing methylene chloride and continuously digested in this bath for an extended period of time. After they had been dried again, the carbon felts with the oligomers were digested in a bath containing acetonitrile until the oligomers had virtually completely gone into solution. The deep dark blue solution was filtered through a glass-sintered crucible of size G3 and the filtrate was evaporated to dryness in a rotary evaporator. The crude product was comminuted by mechanical means, washed with water, dried, digested with methylene chloride for 12 hours, then filtered off and dried. This gave 24.2 parts of a solid having a bronze metal shine. Elemental analysis gave the following values: 44.4% of C, 3.2% of H, 23.2% of S, 7.5% of F. A pellet of the ground product had a specific conductivity of $2.1 \times 10^{-3}$ S/cm. DTG at 245° C. showed a weight loss of less than 10%. DSC showed a maximum at 310° C. In the mass spectrum of the undoped form, the molecular ions of the pentamers (m/e=562) and hexamers (m/e=674) were detected. GPC of the undoped form showed that more than 90% of the product consisted of pentamers and hexamers. In the UV/VIS/NIR spectrum in tetrahydrofuran, the undoped pentamer showed a maximum at $\lambda=460$ nm and the undoped hexamer a maximum at $\lambda=486$ nm. 14.0 g of this poly(3-methoxythiophene) tetrafluoroborate were dissolved in 2 dm³ of acetonitrile. 77 g of tetrabutylammonium hexafluorophosphate were added with stirring. The solution was stirred for about 1 hour. Already precipitated crude produce was filtered off through a glass-sintered crucible of pore size G3. The residue was digested twice with 500 cm³ each of dichloromethane, filtered through a glass-sintered crucible of pore size G3 and dried. The remaining crude product was isolated by concentrating the solution in a rotary evaporator and likewise digesting the residue with 500 cm³ each of dichloromethane, filtering the mixture through a glass-sintered crucible of pore size G3, and drying the product. The combined crude products (13.0 g) were dissolved in 2 dm³ of acetonitrile and again subjected to the procedure described above. This gave 11.8 g of a solid having a bronze metal shine. Elemental analysis gave the following values: 42.2% of C, 2.9% of H, 20.7% of S, 3.8% of P, 13.4% of F. A pellet of the ground product had a specific conductivity of $2.2 \times 10^{-3}$ S/cm. TG up to 270° C. showed a weight loss of less than 10%. DCS showed an exothermic maximum at 340° C. The product was more soluble in various organic solvents, for example in acetonitrile, than the starting material. The UV/VIS/NIR spectrum, the mass spectrum and also GPC of the undoped form gave data which were identical to those measured using the starting material.

EXAMPLE 3

The poly(3-methoxythiophene) tetrafluoroborate used for this example was prepared as described in Example 2. 14.0 g of this poly(3-methoxythiophene) tetrafluoroborate were dissolved in 1.8 dm³ of acetonitrile. A solution of 60.3 g of tetrabutylammonium p-toluenesulfonate in 200 cm³ of acetonitrile were added with stirring. The solution was stirred for about 1 h. Already precipitated crude product was filtered off through a glass-sintered crucible of pore size G3, washed twice with 500 cm³ each of dichloromethane and dried. The remaining crude product was isolated by concentrating the solution in a rotary evaporator and likewise digesting the residue with 500 cm³ each of dichloromethane, filtering the mixture through a glass-sintered crucible of pore size G3, and drying the product. The combined crude products (9.2 g) were dissolved in 2 dm³ of acetonitrile, an insoluble component was removed by filtration through a glass-sintered crucible of pore size G3 and the filtrate was again subjected to the procedure described above. This gave 7.45 g of a solid having a bronze metal shine. Elemental analysis gave the following values: 47.7% of C, 3.5% of H, 23.6% of S, <0.3% of F. A pellet of the ground product had a specific conductivity of $3.4 \times 10^{-4}$ S/cm. The thermal stability had improved in comparison with the starting material. TG up to 300° C. showed a weight loss of less than 10%. DSC showed an exathermic maximum at 335° C. The UV/VIS/NIR spectrum, the mass spectrum and also GPC of the undoped form gave data which were identical to those measured using the starting material.

EXAMPLE 4

The poly(3-methoxythiophene) tetrafluoroborate used for this example was prepared as described in Example 2. 14.0 g of this poly(3-methoxythiophene) tetrafluoroborate were dissolved in 2.0 dm³ of acetonitrile and added, with stirring, to a solution of 3.0 g of sodium methylmethacrylate/methacrylic acid copolymer in 2.0 cm³ of water. The solution was stirred for about 1 hour and then brought to a pH of <5 with 50% strength aqueous tetrafluoroboric acid. The precipitated crude product was filtered off through a glass-sintered crucible of pore size G3, washed twice with 500 cm³ each of water and dried. The product was then ground, washed twice with 500 cm³ each of dichloro-methane and dried. This gave 12.1 g of a blue solid. Elemental analysis gave the following values: 41.3% of C, 2.9% of H, 21.3% of S, 7.3% of F. A pellet of the ground product had a specific conductivity of $1.4 \times 10^{-3}$ S/cm TG up to 270° C. showed a weight loss of less than 10%. DSC showed an exothermic maximum at 340° C. The product had better film-forming properties and greater adhesive properties on polyethylene terephthalate than the starting material.

EXAMPLE 5

First, a poly(3-methoxythiophene) tetrachloroferrate was prepared: 11.4 parts of 3-methoxythiophene were dissolved in 200 parts by acetonitrile, and 73.1 parts of anhydrous iron(III) chloride were added. The solution was stirred for 1 hour and then stirred into 500 parts of methanol. The precipitate was washed with methanol until the filtrate remained colorless. After drying, the crude product was comminuted by mechanical means, continuously digested with methylene chloride, filtered off through a glass-sintered crucible of pore size G3 and dried. The soluble component was extracted from the purified crude product by stirring it over acetonitrile for several hours and isolated by evaporation of the solvent in a rotary evaporator. This gave 3.8 parts of a solid having a bronze metal shine. Elemental analysis gave the following values: 38.5% of C, 2.7% of H, 20.5% of S, 17.3% of Cl, 6.9% of Fe. A pellet of the ground product had a specific conductivity of $1.6 \times 10^{-3}$ S/cm. TG up to 220° C. showed a weight loss of less than 10%. DSC showed an exothermic maximum at 290° C. 6.7 g of this poly(3-methoxythiophene) tetrachloroferrate were dissolved in 3.8 dm³ of acetonitrile. A solution of 33 g of tetrabutylammonium tetrafluoroborate in 200 cm³ of acetonitrile was added with stirring. The solution was stirred for about 1 hour. Already precipitated crude product was filtered off through a glass-sintered crucible of pore size G3, washed twice with 500 cm³ each of dichloromethane and dried. The remaining crude product was isolated by concentrating the solution in a rotary evaporator and likewise digesting the residue with 500 cm³ each of dichloromethane, filtering the mixture through a glass sintered crucible of pore size G3, and drying the product. The combined crude products (6.2 g) were dissolved in 2 dm³ of acetonitrile, an insoluble component was removed by filtration through a glass-sintered crucible and the filtrate was again subjected to the procedure described above. The product was washed with water and dried. This gave 3.8 g of a solid having a bronze metal shine. Elemental analysis gave the following values: 23.0 of C, 1.6% of H, 12.9% of S, 32.8% of F, 2.4% of Cl. A pellet of the ground product had a specific conductivity of $03.3 \times 10^{-4}$ S/cm. The thermal stability had improved in comparison with the starting material TG up to 290° C. showed a weight loss of less than 10%. DSC showed an exothermic maximum at 330° C. The product was more soluble in various organic solvents, for example in acetonitrile, than the starting material.

We claim:

1. A process for the preparation of a modified intrinsically electrically conducting polymer in the oxidized (doped) form, said polymer consisting essentially of at least one polymer radical cation and the equivalent amount of at least one anion, wherein the polymer radical cation on the average comprises 20 to 100% of structural units which through linkage via the 2-position and/or 5-position are derived from at least one monomer of the formula

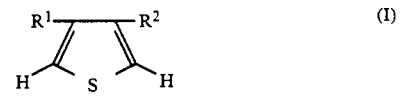

in which
R¹ represents a $C_1$-$C_{12}$-alkoxy group, $C_2$ to $C_{22}$ alkyl group, —$CH_2O(CH_2CH_2O)_nCH_3$ or —$O(CH_2CH_2O)_nCH_3$, where n is 1 to 4 and
R² represents a hydrogen atom, a $C_1$-$C_{12}$-alkyl group or a $C_1$-$C_{12}$ alkoxy group,
0 to 80% of structural units which are derived from at least one electron-rich heteroaromatic compound which can form electrically conducting polymers and is copolymerizable with the monomers (I),
and the anions consist essentially of:
from at least about 10% to essentially 100% by weight of at least one monomeric or polymeric organic one inorganic ion having at least one atom or at least one functional group which can carry at least one negative charge and represents the conjugate base of a Bronsted acid, and
from essentially 0% up to essentially the balance of said anions being an inorganic anion selected from the group consisting of halides, pseudohalides, halo complex anions of an element from groups 3a, 4a and 5a of the periodic table of the elements, oxo complex anions of an element from groups 3a, 4a, 5a, 6a and 7a and anionic complexes of the transition metals, or an organic ion
the degree of polymerization of the polymer radical cation ranging from three to one hundred structural units, said process comprising:

exchanging from at least 10% to essentially 100% by weight of the inorganic anion residually present because of the inorganic anion-containing electrolyte used during doping for at least one monomer or polymer organic anion in solution in the presence of a dissolved salt containing said monomer or polymer organic anion, the anion exchange taking place by establishing the solution equilibrium, taking into account the solubility products of the salts present, and obtaining the said modified intrinsically electrically conducting polymer in the oxidized (doped form, the chemical structure and the degree of polymerization of the polymer radical cation being independent of the particular anion or anions present in the polymer structure.

2. The process as claimed in claim 1, wherein the inorganic anions are tetrafluoroborate or hexafluorophosphate or combinations thereof.

3. The process as claimed in claim 2, wherein the inorganic anions are tetrafluoroborate ions.

4. The process as claimed in claim 1, wherein from 50 to essentially 100% of the anions are a phenolate, a carboxylate, a phosphonate, a sulfonate, or a combination thereof.

5. The process as claimed in claim 4, wherein from 80 to essentially 100% of the anions are an aryl sulfonate, a perfluoroalkyl sulfonate, or a perfluoroalkyl carboxylate.

* * * * *